(12) United States Patent
Stelling

(10) Patent No.: US 12,372,497 B2
(45) Date of Patent: Jul. 29, 2025

(54) PLATE CUSHION DEVICE HAVING A COMPRESSION GAP LOCK

(71) Applicant: Alpaqua Engineering, LLC, Beverly, MA (US)

(72) Inventor: Olaf Stelling, Beverly Farms, MA (US)

(73) Assignee: Alpaqua Engineering, LLC, Beverly, MA (US)

( * ) Notice: Subject to any disclaimer, the term of this patent is extended or adjusted under 35 U.S.C. 154(b) by 0 days.

(21) Appl. No.: 17/887,481

(22) Filed: Aug. 14, 2022

(65) Prior Publication Data

US 2023/0058962 A1 Feb. 23, 2023

Related U.S. Application Data

(60) Provisional application No. 63/234,480, filed on Aug. 18, 2021.

(51) Int. Cl.
*B01L 3/00* (2006.01)
*G01N 27/74* (2006.01)

(52) U.S. Cl.
CPC .......... *G01N 27/74* (2013.01); *B01L 3/5085* (2013.01)

(58) Field of Classification Search
CPC .............................. B01L 3/5085; G01N 27/74
See application file for complete search history.

(56) References Cited

U.S. PATENT DOCUMENTS

| | | | |
|---|---|---|---|
| 4,162,674 A | 7/1979 | Klein | |
| 5,186,827 A | 2/1993 | Liberti et al. | |
| 5,395,498 A * | 3/1995 | Gombinsky | G01N 27/44726 204/464 |
| 5,519,373 A | 5/1996 | Miyata | |
| 5,571,481 A | 11/1996 | Powell et al. | |
| 5,705,062 A | 1/1998 | Knobel | |
| 5,733,405 A | 3/1998 | Taki | |
| 5,733,442 A | 3/1998 | Shukla | |
| 5,795,470 A | 8/1998 | Wang et al. | |
| 6,255,478 B1 | 7/2001 | Komai et al. | |
| 6,451,189 B2 * | 9/2002 | Anderson | G01N 27/44782 204/462 |

(Continued)

FOREIGN PATENT DOCUMENTS

DE 20 2014 102 945 U1 8/2014
EP 0589636 9/1993

(Continued)

OTHER PUBLICATIONS

International Search Report for PCT PCT/US2015/055612, mailed Jan. 14, 2016.

(Continued)

*Primary Examiner* — Paresh Patel
(74) *Attorney, Agent, or Firm* — Antoinette G Giugliano PC; Antoinette G Giugliano

(57) ABSTRACT

The present invention relates to a magnet plate for use in isolating a macromolecule from a mixture in a vessel, wherein the magnet plate has a reversible compression lock. The reversible compression lock engages the top plate and the base plate, wherein when in a locked position, the top plate is fixed and cannot move up and down, along the axis of the support or corner post and when in an unlocked position, the top plate is movable up and down along the axis of the support.

23 Claims, 2 Drawing Sheets

(56) References Cited

U.S. PATENT DOCUMENTS

| | | | |
|---|---|---|---|
| 6,610,186 B1* | 8/2003 | Mayer | B01D 57/02 204/647 |
| 6,755,384 B2* | 6/2004 | Gorfain | G01N 35/0099 248/618 |
| 6,764,859 B1 | 7/2004 | Kreuwel et al. | |
| 6,870,047 B2 | 3/2005 | Kleiber et al. | |
| 7,384,559 B2 | 6/2008 | a Brassard | |
| 7,474,184 B1 | 1/2009 | Humphries et al. | |
| 7,551,051 B2 | 6/2009 | Ugai et al. | |
| 7,718,072 B2 | 5/2010 | Safar et al. | |
| 8,062,846 B2 | 11/2011 | Bortolin et al. | |
| 8,071,395 B2 | 12/2011 | Davis et al. | |
| 8,597,878 B2 | 12/2013 | Hillebrand et al. | |
| 8,658,042 B2 | 2/2014 | Fasching | |
| 8,703,931 B2 | 4/2014 | Euting et al. | |
| 9,140,634 B1 | 9/2015 | Knippschild et al. | |
| 9,416,399 B2 | 8/2016 | Euting et al. | |
| 9,663,780 B2* | 5/2017 | Stelling | B03C 1/01 |
| 10,087,438 B2* | 10/2018 | Stelling | C12N 15/1013 |
| 10,208,303 B2* | 2/2019 | Stelling | H01F 7/0273 |
| 11,400,460 B2* | 8/2022 | Stelling | B03C 1/01 |
| 2001/0014466 A1 | 8/2001 | Lubenow et al. | |
| 2002/0098121 A1 | 7/2002 | Astle | |
| 2004/0142384 A1 | 7/2004 | Cohen et al. | |
| 2005/0012586 A1 | 1/2005 | Sutardja | |
| 2005/0072674 A1 | 4/2005 | Heins et al. | |
| 2006/0055266 A1 | 3/2006 | Iwami et al. | |
| 2006/0158292 A1 | 7/2006 | Ugai et al. | |
| 2006/0207944 A1 | 9/2006 | Siddiqi | |
| 2007/0182517 A1 | 8/2007 | Humphries et al. | |
| 2007/0218566 A1 | 9/2007 | Barten et al. | |
| 2008/0171337 A1 | 7/2008 | Miyazaki et al. | |
| 2008/0199365 A1 | 8/2008 | Chu | |
| 2008/0206751 A1 | 8/2008 | Squirrell et al. | |
| 2010/0227387 A1 | 9/2010 | Safar et al. | |
| 2010/0311608 A1 | 12/2010 | Osada et al. | |
| 2013/0241686 A1 | 9/2013 | Nakatsu | |
| 2013/0344605 A1 | 12/2013 | Hayden | |
| 2014/0186236 A1 | 7/2014 | Euting et al. | |
| 2016/0108392 A1 | 4/2016 | Stelling | |
| 2016/0368001 A1 | 12/2016 | Park | |
| 2017/0226502 A1 | 8/2017 | Stelling | |
| 2017/0363569 A1* | 12/2017 | Ivanov | G01N 33/48721 |
| 2018/0028990 A1 | 2/2018 | Frodsham et al. | |
| 2018/0362963 A1* | 12/2018 | Stelling | B01L 9/523 |
| 2018/0362964 A1 | 12/2018 | Stelling | |
| 2019/0160473 A1 | 5/2019 | Stelling | |
| 2020/0063118 A1* | 2/2020 | Stelling | B01L 9/523 |
| 2020/0181684 A1 | 6/2020 | Tiedtke et al. | |
| 2021/0180043 A1 | 6/2021 | Carrese | |

FOREIGN PATENT DOCUMENTS

| | | |
|---|---|---|
| EP | 0 589 636 A1 | 3/1994 |
| EP | 1404450 B1 | 11/2005 |
| EP | 2082806 A2 | 7/2009 |
| EP | 2 565 260 A2 | 3/2013 |
| WO | WO 1996/15440 | 5/1996 |
| WO | WO 2000/23807 | 4/2000 |
| WO | WO 2003/044537 A1 | 5/2003 |
| WO | WO2003090897 | 11/2003 |
| WO | WO 2004077647 | 9/2004 |
| WO | WO 2005/008209 A2 | 1/2005 |
| WO | WO 2005/008861 A1 | 1/2005 |
| WO | WO 2006/072593 A2 | 7/2006 |
| WO | WO2009076560 | 6/2009 |
| WO | WO 2014/007074 A1 | 1/2014 |
| WO | WO2016061285 | 4/2016 |
| WO | WO2019057345 A1 | 3/2019 |
| WO | WO2020041339 | 2/2020 |
| WO | WO2020041345 | 2/2020 |

OTHER PUBLICATIONS

Written Opinion of the International Searching Authority for PCT PCT/US2015/055612, mailed Jan. 14, 2016.

Communication pursuant to Article 94(3) EPC for EP Application No. 15790728.8, mailed May 15, 2018.

International Preliminary report on Patentability for PCT/US2015/055612, mailed Apr. 27, 2017.

Schimp, Paul H "A Detailed Explanation of Solenoid Force" *Int. J. on Recent Trends in Engineering and Technology*, 8(2):7-14 (Jan. 2013).

International Search Report and Written Opinion, PCT application No. PCT/US2019/047310, mailed Oct. 9, 2019.

Brochure "Alpaqua Liquid Handling Products, MagPlate 24, 24-well Magnet Plate", Alpaqua Engineering, LLC, 100 Cummings Center, Suite 424A Beverly, MA 01915 (2011). 2 pages.

Brochure "Alpaqua Accelerating Genomic Discovery, MagPlate 24, 24-well Magnet Plate", Alpaqua Engineering, LLC, 100 Cummings Center, Suite 424A Beverly, MA 01915 (2011).

International Search Report and Written Opinion, PCT application No. PCT/US2019/047302, mailed Nov. 22, 2019.

International Preliminary Report on Patentability, PCT application No. PCT/US2019/047302, mailed Mar. 4, 2021.

International Preliminary Report on Patentability, PCT application No. PCT/US2019/047310, mailed Mar. 4, 2021.

Direct Industry "Deep pot holding magnet BASN0110" Retrieved from internet http://www.directindustry.com/prod/ima/product-16882-1554759.html on Jun. 30, 2023, 3 pages.

Amazing Magnets "RD500B" Retrieved from internet https://amazingmagnets.com/product/rd.500b/ on Jun. 30, 2023, 6 pages.

Amazing Magnets "Magnets and Supplies" http://www.amazingmagnets.com/parts.asp Aug. 12, 2002 retrieved from Internet Archive Wayback Machine http://web.archive.org/web/20020812212510/http:/www.amazingmagnets.com/parts.asp on Jun. 30, 2023, 1 page.

Amazing Magnets "Product Features" http://www.amazingmagnets.com/products.asp?ID=01240 Nov. 2, 2004 retrieved from Internet Archive Wayback Machine http://web.archiveorg/web/20041102173212/htt:/www.amazingmagnets.com/products.asp?ID=01240 on Jun. 30, 2023, 1 page.

Amazing Magnets "Browse Magnets by Shape>Rod>" http://www.amazingmagnets.com/index.asp?PageAction=VIEWCATS&Category=25597&Page=2. Nov. 2, 2006 retrieved from Internet Archive Wayback Machine http://web.archive.org/web/20060307000528/http:/www.amazingmagnets.com/index.asp?PageAction=VIEWCATS&Category=25597&Page=2 on Jun. 30, 2023, 4 pages.

International Preliminary Report on Patentability, PCT application No. PCT/US2022/040279, mailed Nov. 28, 2022.

\* cited by examiner

Locked Compression Gap Maintained

PLATE CUSHION DEVICE HAVING A COMPRESSION GAP LOCK

RELATED APPLICATION

This application claims the benefit of U.S. Provisional Application No. 63/234,480, entitled, "Plate Cushion Device Having A Compression Gap Lock" by Olaf Stelling, filed Aug. 18, 2021.

The entire teachings of the above application are incorporated herein by reference.

BACKGROUND OF THE INVENTION

Plate cushion devices, such as magnetic separator plates or magnet plates, are used to perform biological assays. A standard magnetic separator plate is equipped with springs to provide flexible support for a sample holder (e.g., a microtiter plate). It is a separate device that is placed underneath the sample holder on a liquid handling workstation.

In certain embodiments, the spring mechanism affording the flexibility is integrated into devices that perform a particular function apart from providing flexible support to a sample holder. An example would be a magnetic separator used in magnetic bead extractions. These magnetic separators can be, and frequently are, used for both automated extractions on a liquid handler, as well as work performed manually by a lab technician using hand pipettes. Labs typically have a limited number of magnet plates available, so the same devices may be used for manual and automated processing. This may even be mandatory in cases where the manual process is performed to confirm results obtained by a robot.

The spring mechanism, while important to ensure accurate pipetting by the robot, can be perceived as detrimental by a user performing the work by hand as it adds a freedom of movement to the work piece some may find undesirable.

Therefore, a need exists for a mechanism to temporarily and reversibly disable the flexible platform function and lock the movement of the top plate of the magnet plate while they are being used for manual pipetting.

SUMMARY OF THE INVENTION

The present invention relates to a plate cushion device, such as a magnet plate, that has a reversible compression lock. Specifically, the magnet plate of the present invention is for use in isolating a macromolecule from a mixture in a vessel. The inventive magnet plate has the following: at least one magnet for use in isolating macromolecules from a mixture in a vessel when the macromolecules adhere to paramagnetic beads to form a complex, a top plate adapted to receive a plurality of magnets (e.g., a plurality of magnet openings to receive the magnets), wherein the top plate is in communication with at least one movable connector (e.g., spring, foam, air cushion, and magnet assembly) (e.g., 2, 3, 4, 5, 6, 7, 8, or more) and at least one support wherein the support having a top end and a bottom end that defines an axis. The movable connector shown in the attached figures is a compression spring. The magnet plate of the present invention also has at least one movable connector/spring that communicates with the top plate and a base plate, wherein when in use and the movable connector/spring is uncompressed, a compression gap is defined between the top plate and a base plate and when the movable connector/spring is compressed, the compression gap is reduced or removed.

The magnet plate of the present invention further includes a support plate to support the magnets, wherein the support plate is at the top plate; the base plate that is in communication with the support and is placed beneath the top plate, and at least one reversible compression lock (e.g., 1, 2, 3, 4, 5, 6, or more) that engages the top plate and the base plate, wherein when in a locked position, the top plate is fixed and cannot move along the axis of the support and when in an unlocked position, the top plate is movable along the axis of the support. The support of the magnet plate of the present invention, in one aspect, can include least one post with a top end and a bottom end, the top plate has at least one post opening for receiving the top end of the post and at least one spring that surrounds the post, and a base plate that receives the bottom end of the post. In another aspect, the support has at least one post with a top end and a bottom end, the top plate receives the top end of the post and at least one spring that surrounds the post, and a base plate that has at least one post opening for receiving the bottom end of the post. The present invention can have 1, 2, 3, 4, or more supports.

The reversible compression lock used with the magnet plate of the present invention, in an embodiment, engages the top plate and the base plate, wherein when in a locked position, the top plate is fixed and cannot move along the axis of the support or compression and when in an unlocked position, the top plate is movable along the axis of the support or compression. In an embodiment, the reversable compression lock includes at least one fastener. In one embodiment, the fastener can be housed in the base plate and engaged with the top plate to prevent it from moving, or housed in the top plate and engaged with the base plate to prevent it from moving, to put the magnet plate in the locked position. In certain embodiments, the fastener of reversible compression lock engages the top plate and maintains the compression gap. In this case, the magnet plate has a height and when in a locked position, the height is of the magnet plate is about the same as the height of the magnet plate when the spring is uncompressed. In another embodiment, the fastener of reversible compression lock used in the present invention engages the top plate and removes the compression gap. In this case, the magnet plate has a height and when in a locked position and the compression gap removed, the height of the magnet plate is less than the height of the magnet plate when the spring is uncompressed. Examples of fasteners include a screw, a latch, a nut & bolt arrangement, a clip, a magnet, an electromagnet, a locking pin, a spring, or a combination thereof.

In another embodiment, the reversible compression lock used with the magnet plate of the present invention includes a (e.g., at least one) stopper and when in the locked position, the stopper engages the top plate and the bottom plate to maintain the compression gap, and when in the unlocked position, the stopper does not engage the top plate and the bottom plate to maintain the compression gap. Examples of the stopper include a block, a wedge, an insert, an air bladder, elastic material and the like.

Regardless of which type of mechanism is utilized, a fastener or a stopper, to lock and unlock the compression of the magnet plate, the magnet plate of the present invention can be locked or unlocked by the user as desired.

The present invention includes methods for using a plate cushion device e.g., a magnet plate, having a reversible compression lock. The method of the present invention is for purifying a macromolecule from a liquid sample having a mixture. The steps of the inventive method include the following: collecting the liquid sample in a vessel; and adding magnetic beads to the liquid sample, wherein these steps can be performed in any order under conditions to form a macromolecule-magnetic bead complex between the macromolecule and the magnetic bead. The steps further include separating the complex from the sample by placing the vessel within reach of a magnetic field of a magnet (e.g., on the magnet or in a cavity of a magnet) of a magnet plate described herein. In an embodiment, one or more of the steps of the present invention further includes engaging the reversible compression lock to put the lock into the locked position and carrying out one or more steps using a manual pipette. Once experiments or steps involving manual pipetting are finished, the inventive method further includes engaging the reversible compression lock to put the lock into the unlocked position and carrying out one or more steps e.g., using an automated pipette. The inventive method further includes the step of eluting the nucleic acid material from the magnetic beads. The sample can include an extracellular matrix, cell debris, plasma, saliva, or a combination thereof. In an embodiment, the method of the present invention includes the step of lysing the sample before adding magnetic beads to the sample.

The present invention also includes kits for use in isolating macromolecules from a mixture in a vessel when the macromolecules adhere to paramagnetic beads to form a complex. The kit of the present invention includes the magnet plate including a compression gap lock described herein and a vessel for holding the mixture having the macromolecule, wherein the vessel is placed within reach of a magnetic field of a magnet. The inventive kit can further include magnetic beads, buffer compositions and the like. The kit further includes a tool to engage the compression gap lock and/or the fastener.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1A:
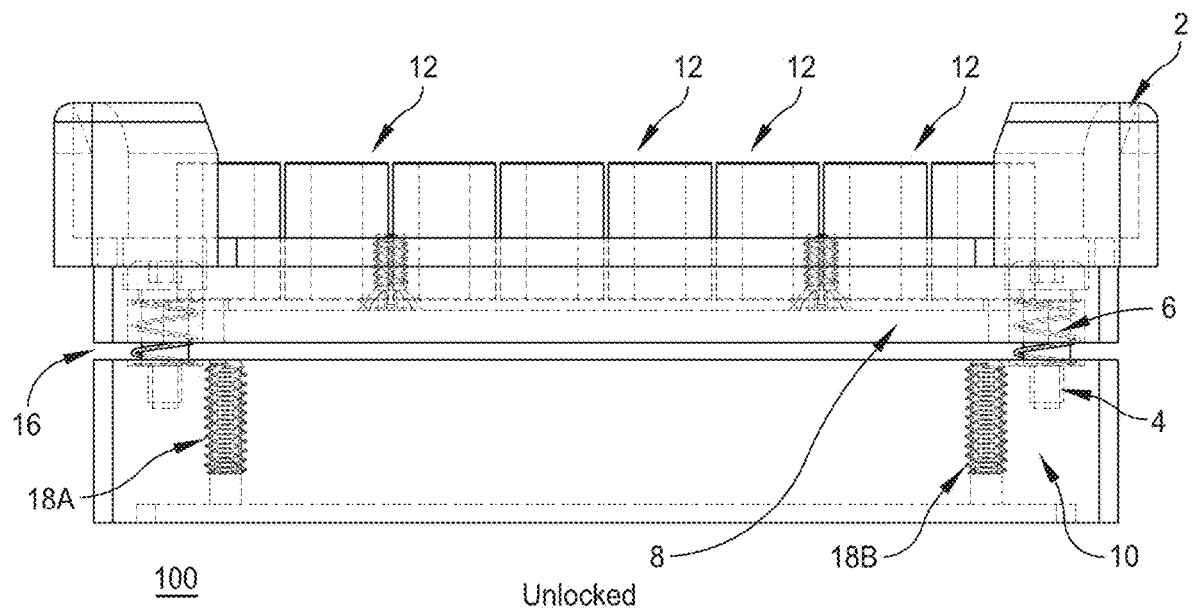
FIG. 1A is a front view of the magnet plate of the present invention showing the magnet plate in the unlocked position and the reversible compression lock utilizes set screws.

A description of preferred embodiments of the invention follows.

The present invention relates to a spring-based magnet plate or plate cushion device having a compression gap lock. The spring-based magnet plate of the present invention allows the user to essentially lock the springs in place to take away its ability to compress and decompress. This is useful for performing certain experiments and/or manual pipetting. The locking mechanism works by securing a fastener or stopper that prevents the top plate from moving up and down. The fastener is attached and interacts with the base plate and the top plate to prevent spring compression or, in the case of a stopper, it communicates with the top plate and the base plate to prevent compression. The user can reversibly lock the compression gap as needed or desired.

As used herein, the term "compression" refers to the up and down movement of the top plate toward the bottom plate. The compression movement provides a cushion during pipetting. Although the term "compression" stems from the use of a compression spring in the magnet plate, other forms of springs such as an extension spring could be used in the magnet plate. In fact, any movable elastic connector can be used to provide a cushion or compression movement. Examples include one or more foam pads, spring assemblies (including coil springs), air cushions, and magnet assemblies. As such, the term "compression" is not meant to limit the type of spring or movable connector used in the magnet plate. Further, the phrase "compression gap" refers to the gap or space between the top plate and the base plate when the spring is not compressed or the immovable connector is not engaged (e.g., in a resting state). The phrase "compression gap lock" refers to the device of the present invention that makes the top plate immovable in relation to the base plate and/or renders the movable connector inoperable (e.g., the compression spring does not freely move in response to a downward pressure to the top plate).

The movable connector that provides the cushion or compression movement is located between the top plate 2 and the base plate 10 of the magnet plate system 100. The idea is to provide compression movement or cushion when force when pressure is applied from above. This can be achieved by movable connectors such as spring assemblies, foam pads, air cushions, or magnets. For the foam pad, a variety of different foams could be employed that can be selected on the basis of their resiliency and durability. For the spring assembly, the same factors can apply. In an aspect, the springs can be standard coiled springs (shown in figures), conical coiled springs, extension springs, or even flat springs. The air cushion could be a static air cushion or a regulated pressure air cushion that is supported by an air compressor. The air compressor version could be regulated to convey various resistances to the plate holder. In an instance, the air cushion can be an air bladder. Finally magnetic repulsion could be employed by putting magnets of the same polarity on the underside of the top plate and on the topside of the base plate.

Referring to FIG. 1A, magnet plate 100 has top plate 2 (also referred to as guide plate) that has magnet receivers (i.e., the holes/openings that receive magnets 12). The magnet receivers are arranged along 8 rows and 12 columns or any other number or pattern. Each magnet receiver receives a magnet 12. Springs 6 are placed around shoulder posts 4 at the corners of top plate 2. The shoulder posts 4, and springs 6, pass through top plate 2 and connect to or communicate with base plate 10. In an embodiment, posts can be any support that works with a guide opening and defines an axis to allow the top plate to move up and down when in use and in an unlocked position. In one aspect, the axis is defined by the spring compression which, in the case of the embodiments shown in the drawings, is the same as that of the support. In one embodiment, the post or support can be attached to the bottom plate and the top plate has guide openings to receive the supports, or the supports can be attached to the top plate and the guide openings can be in the bottom plate. The springs allow flexibility in the leveling of the magnets, and thus any vessels placed thereon. The movable connectors (e.g., springs) can be placed around the posts, at the post or at other locations between the top plate and the base plate. Experiments are carried out within the vessels which are part of the sample holder (e.g., assay or microtiter plate). When the vessels are placed on the magnet, the magnet, depending on its shape, will create magnetic fields within the vessel. The magnetic field created within the vessel allows the paramagnetic beads within the vessel to aggregate so that the user or the robot can pipette components from the vessel to perform the experiment. U.S. Pat. No. 6,755,384 discloses flexible platforms for liquid handling robots and U.S. Pat. Nos. 9,663,780, 10,087,438, 10,208,303, 11,400,460 and Patent Publication Nos. 20180362963 & 20200063118 describe various types of magnets that can be used with magnet plates (the entire teachings of these patents and patent publications are incorporated herein by reference). With the springs, robot pipetting from the vessels can be accomplished more efficiently. In an embodiment, support plate 8 is made from metal, and an affinity exists between the support plate and the magnets. In other embodiments, the magnets can be affixed to the support plate in other ways such as with an adhesive or paste. Further underneath, below both the top plate and the support plate, is base plate 10. Top plate 2 can be fastened to base plate 10 by inserting shoulder posts 4 (e.g., bolts) through the shoulder bolt receivers found at the corners of the two plates. In some embodiments, the shoulder bolts and the springs can be on each of the four corners of the plates, whereas in other embodiments they can be in alternative locations (e.g., along portions of the edges or on some of the corners only). Additionally, the shoulder bolts can be any support located between the top plate and the base plate so long as it acts as a guide and defines and axis to allow the top plate to move up and down when in an unlocked position. In an embodiment, the support plate is made from a material that has affinity to magnets. It can be made from a metal such as iron, nickel, cobalt, or an alloy of different materials (e.g., stainless steel). The magnet plates can utilize a plurality of single magnets or block magnets.

The base plate 10 of magnet plate system 100 can be a base that is designed to fit on top of the labware holder or directly onto the deck of the liquid handler. The base plate, in an embodiment, can have alignment pins placed on the bottom to align with the labware holder/liquid handler to keep itself in place. The base plate can be manufactured from metal (sheet or cast) or a variety of polymers that could have various degrees of flexibility. Similarly, the base plate is made from aluminum, but can also be any material suitable for machining, thermoforming, 3d-printing, injection molding, or other methods of shaping.

The top plate 2 of magnet plate system 100, in an embodiment, is made to receive magnets 12 and a microtiter plate or other sample holders such as tubes or tube strips. The top plate can be made from an engineering plastic (e.g., polycarbonate, acetal), aluminum, or any other suitable material known in the art. The top plate 2 is from a rigid material (e.g., acetal, polycarbonate, aluminum, Teflon™ material, brass, Acrylonitrile butadiene styrene (ABS), polystyrene) that is suitable to receive magnets 12 and hold microtiter plates. In an embodiment, it is made from a polycarbonate block into which holes are bored to receive magnets 12. Similarly, the top plate can also be any material suitable for machining, thermoforming, 3d-printing, injection molding, or other methods of shaping.

Magnet plate system 100 of the present invention has a reversible compression lock 18A and 18B. In FIG. 1A, the reversible compression locks 18A and 18B are screws (i.e., set screws) that are housed in base plate 10. The bottom of base plate 10 has openings to allow access to the bottom end of the screws such that the user can engage the screws (e.g., with a tool or fingers) to unlock or lock compression gap 16. FIG. 1A shows of the device in an unlocked position since screws 18A and 18B are fully residing within the base plate. The top plate can freely move up and down along the axis defined by posts 4 or the spring compression as the spring compresses and decompresses according to the force applied from above during pipetting. The integrated spring components, when the magnet is unlocked, enable complete liquid removal without tip occlusion. The springs effectively cushion the wells, and allow the plates (e.g., top plate, support plate) to give way when tips (e.g., pipette tips) come in contact with a well bottom. This compensates for physical tolerances between labware and pipettors, each of which can otherwise compromise the precision of supernatant removal (e.g., aspiration).

Figure 1B:
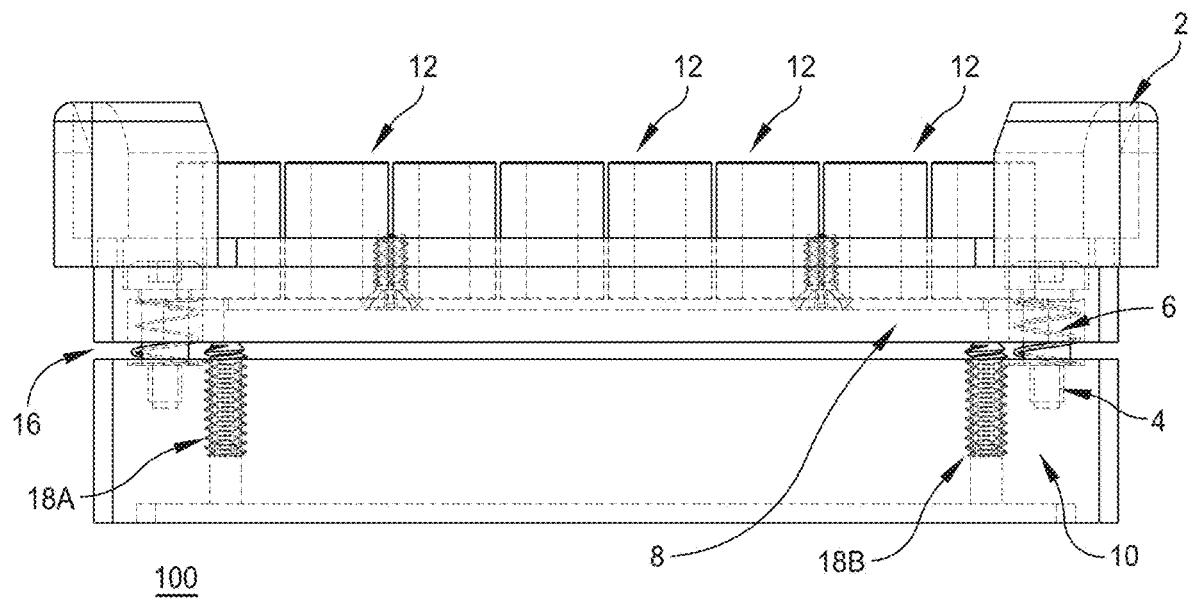
FIG. 1B is a front view of the magnet plate of the present invention showing the magnet plate in the locked position and the reversible compression lock utilizes set screws that engage the bottom of the top plate without screwing into the top plate. Note that the compression gap is maintained in the locked position.

However, the cushioning provided by the springs is not always desired throughout the entire experimentation process or for certain types of experiments. In certain embodiments of the experiments, the user may desire to lock the magnet plate to perform one or more manual steps in the experiment. In comparison, in FIG. 1B, magnet plate 100 is in the locked position and the screws have been engaged such that the top end of the screw is in contact with the bottom surface of top plate 2. When the reversible compression locks 18A and 18B engage the bottom surface of top plate 2, the lock stops the top plate 2 from moving up and down, thus inactivating the movable connectors (e.g., springs). The spring is unable to compress and decompress and is in a resting position. In other words, force from above onto the top plate 2 does not result in compression and decompression of the spring. Reversible compression lock 18A and 18B renders the top plate immovable in relation to the base plate and it cannot move along the axis defined by the support or spring compression. When in the locked position, the user can then perform experiments involving manual pipetting or other experiments in which locking of the top plate is desired.

The reversible compression lock can be any device that communicates with base plate 10 and the bottom plate 2 and prevents the top plate from moving up and down along the axis of the posts 4 (e.g., supports). For example, the reversible compression lock includes fasteners or stoppers. In this embodiment, the locking mechanism does not change the height dimension of the magnet plate. Examples of fasteners include screws (e.g., set screws, flat head screws, or captive screws), latches, nut & bolt arrangements, clips, magnets, electromagnet, locking pins, springs (e.g., gas springs), or a combination thereof. The fasteners can be housed in the base plate or in the top plate, or attached to any portion of the plate. Additionally, stoppers including, blocks, wedges, inserts, air bladders, and the like can be used to maintain compression gap 16. Ideally, the stopper, block, wedge or insert that is used to lock the compression gap has a height that is slightly less than the height of the compression gap when the spring is in a resting position. Such stoppers can be housed in or at the base plate or top plate. Similarly, in yet another embodiment, tools to engage the fastener or stopper can accompany the system or kit of the present invention and/or be stored in the base plate.

Figure 2A:
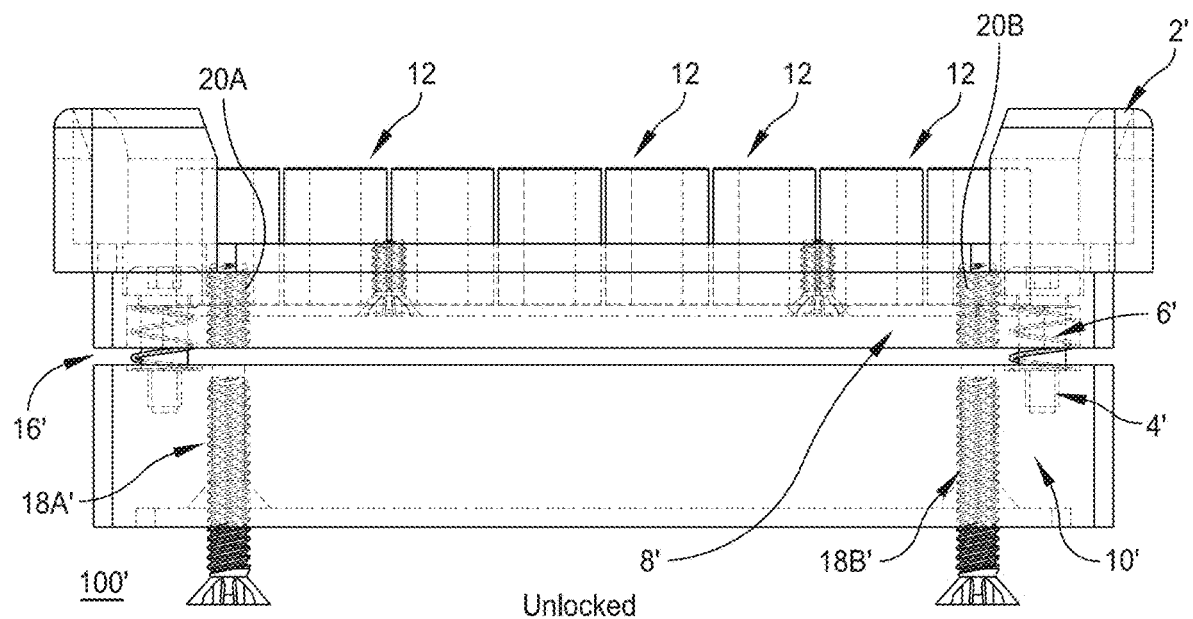
FIG. 2A is a front view of the magnet plate of the present invention showing the magnet plate in the unlocked position and the reversible compression lock utilizes flat head screws. Note that the top plate has screw threads to receive the flat head screws.
Figure 2B:
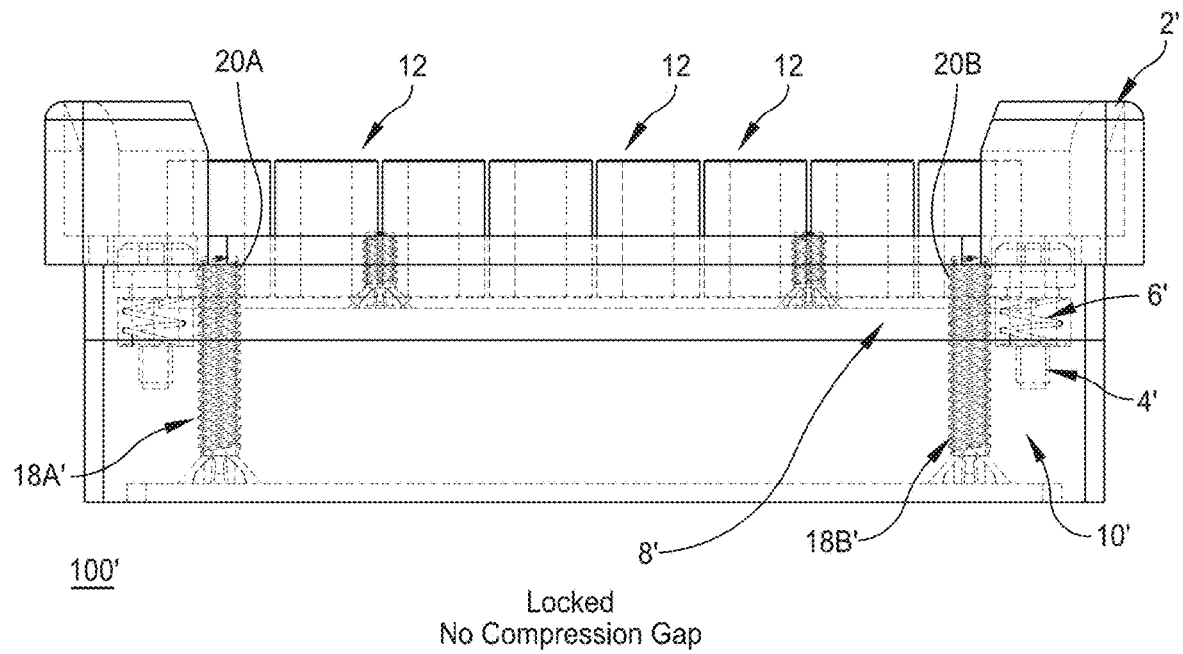
FIG. 2B is a front view of the magnet plate of the present invention showing the magnet plate in the locked position and the reversible compression lock utilizes flat head screws that screw into the top plate. Note that no compression gap exists in the locked position.

With respect to FIG. 2A, the reversible compression lock also uses screws in magnet plate 100', screws 18A' and 18B' (e.g., flat head screws), but in this embodiment, top plate 2' has threads 20A and 20B to receive the screws. In this embodiment, top plate 2 is screwed to the base plate to prevent the compression and depression of spring 6' during use. FIG. 2A shows magnet plate 100' in an unlocked position. The springs can freely compress and decompress in response to downward force from the top plate during pipetting, and compression gap 16' is present when spring 6' is decompressed. In comparison, FIG. 2B has magnet plate 100' in the locked position in which screws 18A' and 18B' are screwed into screw threads 20A and 20B in top plate 2'. As can be seen, no compression gap exists. Springs 6' are compressed but inactive and not able to decompress. In this embodiment, the height or profile of magnet plate 100' is less than that of the unlocked position. In this embodiment, the user has to adjust their experiments and/or lab equipment to accommodate the difference in height of the magnet plate when in a locked position.

In the embodiments shown in the figures, the user of the plate engages the screws 18A and 18B or 18A' or 18B' from the bottom of plate 100 or 100'. In other words, the user flips the entire plate over and engages the screws with a screwdriver or similar tool or built-in handle or with their fingers. Although not shown in the figures, an embodiment of the present invention is to include a compression lock that can be engaged from the side of base plate or the top of the top plate. In one embodiment, an arrangement can be used to engage the fastener or stopper from the side of the base plate, such as a cam lock screw. When engaging the compression lock from the top of the top plate, fasteners similar to that shown in the figures or described herein can be used but engaged from the top.

In many molecular biology procedures, macromolecules are needed in a purified form. For example, to prepare a DNA or RNA sample for study, it can be extracted from any of a variety of clinical sample types, such as tissue, blood, cheek swabs, sputum, forensic material, FFPE samples etc. For example, in certain procedures designed to prepare a DNA sample for sequencing, the initial extraction from the primary sample is followed by a multitude of enzymatic reactions called library construction. Each enzymatic reaction is followed by another extraction step to isolate conditioned nucleic acid from the reaction mix. The enzymatic reactions are typically followed by amplification (using PCR) and/or size selection (to limit the distribution of fragment sizes to a narrow band of a few hundred basepairs (e.g. 500-700 bp)). The workflow from primary sample to sequencing-ready DNA or RNA may involve from 5-10 separate extraction steps. Throughout the workflow, the overall volume of the mix containing the sample, as well as the sample container can vary significantly; typical volumes range from about 2000 µl to 35 µl. These workflows can be performed manually, or they can be automated to achieve increased throughput and potentially better repeatability.

Depending on the nature of the macromolecule to be extracted as well as the matrix they are present in, magnetic beads (more precisely: paramagnetic beads) are coated with moieties (e.g., functional groups, other compounds) to which the macromolecules have affinity. Macromolecules include nucleic acids (e.g., DNA, RNA, PNA) and proteins (e.g., antibodies, peptides). Essentially, any macromolecule that can be made to adhere, reversibly or not, to magnetic beads can be subjected to the methods disclosed herein. For example, the beads might be coated with a carboxylic acid having moiety such as succinic acid. The coupling between the beads and the macromolecules might also rely on streptavidin-biotin or carbo di-imide chemistry. Exemplary coatings include protein A, protein B, specific antibodies, particular fragments of specific antibodies, streptavidin, nickel, and glutathione. The beads themselves can vary in size, but will have an average diameter (e.g., 1 micro-meter). In some embodiments, the paramagnetic properties of the beads will result from integration of iron into an otherwise non-magnetic substance (e.g., 4% agarose gel). Magnetic beads, as well as those that are already coated with various affinity groups, can be purchased from Sigma-Aldrich Corp. (St. Louis, MO, USA), Life Technologies (Now part of Thermo Fisher Scientific) (Grand Island, NY, USA), Thermo Scientific (Rockford, IL, USA), EMD-Millipore (Billerica, MA, USA), New England Biolabs (Ipswich, MA, USA), Cytiva (Marlborough, MA 01752), and Bangs Laboratories (Indianapolis, IN).

In one application of the methods of the present invention using the magnet plate described herein, molecules (e.g., macromolecules) can be purified using magnetic beads by performing the following steps:

mixing the magnetic beads having a particular affinity-conferring functional group with the sample matrix containing the molecule of interest in a container (e.g., a vessel, an Eppendorf tube, a microplate well, a deep well, a PCR well, round-bottom vessel);

after the mixing, allowing for specific binding between the beads and the molecules in conditions suitable therefor (e.g., by manipulating the conditions), thus creating bead-molecule complexes;

placing the bottom of the vessel on or inside the magnet;

allowing the bead-molecule complexes to aggregate (e.g., segregate) in a pattern around the inside perimeter of the vessel (or of each vessel if using multiple ones); and removing the supernatant, which would contain unbound, undesired components;

performing one or more wash steps by adding a suitable solvent, e.g., ethanol, followed by removal of the same.

Additional steps can include re-suspending the bead-molecule complexes in a solvent, so as to obtain a solution with a desired volume and concentration. One can choose the appropriate solvent so that the binding affinity between the beads and the molecules is decreased, allowing them to dissociate from each other. Or one can repeat the steps above to aggregate the magnetic beads again to allow for additional separations, depending on the buffer chosen.

Also the beads may be used to either bind the component of interest, for example nucleic acid molecules, and during the method one discards the supernatant and elutes the component of interest from the beads. Alternatively, one can let the beads bind to a component that one is trying to discard, leaving only the component of interest in the supernatant. In this case, the supernatant is transferred to a new, clean vessel for use or further experimentation and the magnetic beads with their unwanted molecules are discarded.

The above methods can be performed manually or by using automated robotic systems (e.g., automated liquid handling workstations) or aspirating/dispensing manifolds.

Usable workstations for automation include Agilent Bravo, the Beckman Biomek i-series, Eppendorf epMotion, Hamilton Star, Tecan Fluent, and many others. However, when pipetting manually, the technician, depending on the type of experiment, locks the magnet plate of the present invention to render the spring inactive and prevent the top plate from moving up and down. This is so because the technician must take great care to avoid touching the ring of magnetic beads that has formed around the vessel bottom perimeter with the pipet tip, because such contact may cause a portion of the beads, along with their payload (i.e. the extracted macromolecules), to enter the pipet tip and subsequently be aspirated into the tip and discarded along with the supernatant. To avoid touching the beads, the pipet tip needs to be inserted perfectly positioned into the vessel, which requires skill, practice, and dexterity. This task is simplified by the design of the magnet plate of the present invention because having the magnet plate in the locked position prevents movement of the plate. The magnet plate of the present invention, when manually pipetting, greatly reduces the risk of accidentally disturbing the magnetic beads and the resulting bead loss. Accordingly, one or more of the steps of the present invention further includes engaging the reversible compression lock to put the lock into the locked position and carrying out one or more steps e.g., using a manual pipette. In the case of when the reversible compression lock is a stopper, the user may also have an additional step of adjusting the labware or liquid handling robot to account of the difference in height of the magnet plate since the compression gap is removed. Once experiments or steps involving manual pipetting are finished, the inventive method can further include engaging the reversible compression lock to put the lock into the unlocked position and carrying out one or more steps e.g., using an automated pipette.

Once a complex is formed between a macromolecule of interest and a magnetic bead (which might be formed via covalent as well as non-covalent bonds), a magnetic field created by a magnet can be employed to separate the bead-macromolecule complexes from the mixture (e.g., by forming one or more bands of beads in the vessel in close proximity to the magnet). After that, the supernatant can be aspirated (e.g., via pipetting) and the complexes washed (e.g., with ethanol) to further remove contaminants. In a subsequent step the macromolecules can be released from the beads, for example by eluting them via changes in the solution (e.g., buffer composition features such as pH and salt concentration). The present invention allows for easier recovery of the eluate by manual pipetting since the locking mechanism of the present invention allows the user to easily access the eluate without disturbing the bead formation pattern.

The magnet used with the present invention can be a solid core magnet (U.S. Pat. Nos. 9,663,780, 10,087,438, 11,400,460), a discontinuous wall solid core magnet (US Patent Publication No. 20180362963), a discontinuous wall hollow core magnet (U.S. patent Ser. No. 11/242,519), a ring magnet and the like. In one embodiment, the magnet is made from a rare-earth metal such as neodymium. A neodymium magnet can have the chemical composition $Nd_2Fe_{14}B$, where Nd is neodymium, Fe is iron, and B is boron. In some alternative embodiments, the magnet can also be made from samarium (e.g., sintered $SmCo_5$). The magnet can be covered with a protective layer, for example a layer of nickel. Alternative coatings include one or multiple layers, such as nickel, copper, zinc, tin, silver, gold, epoxy resin, or any other suitable material. Such coatings help, among other things, with preventing rusting of the iron component. In each of these embodiments, the full object is referred to as the "magnet". The magnet can have a strength grade which for different embodiments can be, for example, about N35, N38, N40, N42, N45, N48, N50, or N52. Additional magnets with different grades, such as those with higher N-numbers (those that may be manufactured in the future) or different temperature ranges (H-grades), are also included among the embodiments of the present invention. The magnets (e.g., neodymium magnets) can be sintered or bonded. Magnets can be purchased from K&J Magnetics, Inc., Jamison, PA.

In an embodiment, the magnet used with the magnet plate of the present invention can be used in an electromagnetic arrangement in which the magnet is created by use of a stainless steel or other ferromagnetic structure having a coil or solenoid wrapped around it. The solenoid produces a magnetic field when an electric current is passed through it. This configuration can be used to form the magnet and system of the present invention. This arrangement and others known in the art, or developed in the future, can be used to create the magnet system of the present invention.

Magnetic fields are often visualized using lines. Magnetic field lines are imaginary, but they are helpful tools that illustrate the shape and outline of a magnetic field. In such illustrations the lines emanate from one pole of the magnet and re-enter the magnet at the other pole, thus forming a closed loop. The relative strength of the magnetic field at a given location is shown by varying the density of the lines, with higher densities depicting stronger magnetic fields. The magnetic field is strongest at the magnetic poles. The location of the poles on a particular magnetic shape is determined during manufacturing, when the magnetic material is magnetized. The direction of the magnetization is perpendicular to the surface(s) with the wall, in other words, along the axis of the wall. In particular, the magnets used with the present invention are magnetized through the thickness (i.e., along the center axis running between the top surface plane and the bottom surface plane). Each opening has a top surface and a bottom surface, and each such side (top surface and bottom surface) has a certain polarity, which can be designated as north (N) or south (S). When the magnets having an overall cylindrical shape are assembled on a guide plate, they can be arranged in any number of arrangements including alternating rows, alternating columns, checkerboard arrangement or other patterns. Arrangements of polarities are embodied for any top plates that might have a different number of magnet receivers to accommodate various size plates (e.g., 6, 24, 96, 384 or even 1536 sample wells or any other number of wells or pattern).

Standard conditions for forming the macromolecule-bead complex are known in the art and can be found, for example, in Rohland, et al., Cost-Effective High-Throughput DNA Sequencing Libraries For Multiplexed Target Capture, Genome Research 22:939-946 and Supplemental Notes (the entire teachings of which are incorporated herein by reference). For example, reagent kits that can be used to form the macromolecule-bead complex are commercially available, such as the AMPURE composition from Beckman Coulter, or such reagents can be made. One example of a solid phase reversible immobilization reagent that can be made and used with the present invention is a MagNA composition, which is made from:

Sera-Mag SpeedBead Carboxylate-Modified Magnetic Particles (Hydrophylic), 100 mL (Cytiva Life Sciences Product No. 24152105050350; previously known as 0.1% carboxyl-modified Sera-Mag Magnetic Speedbeads (FisherSci, cat. #: 09-981-123)

18% PEG-8000 (w/v) (e.g. Sigma Aldrich, cat. #: 89510)
NaCl
10 mM Tris-HCl, ph 8.0
1 mM EDTA, pH 8.0
Optional: 0.05% Tween 20

To form the macromolecule-bead complex, in one embodiment, 0.5×-3× MagNA in an amount ranging from 10 microliters to 400 microliters can be added to the mixture.

The terms comprise, include, and/or plural forms of each are open ended and include the listed items and can include additional items that are not listed. The phrase "And/or" is open ended and includes one or more of the listed items and combinations of the listed items.

The relevant teachings of all the references, patents and/or patent applications cited herein are incorporated herein by reference in their entirety.

While this invention has been particularly shown and described with references to preferred embodiments thereof, it will be understood by those skilled in the art that various changes in form and details may be made therein without departing from the scope of the invention encompassed by the appended claims.

What is claimed is:

1. A magnet plate for use in isolating a macromolecule from a mixture in a vessel with a pipette having a pipette tip, wherein the magnet plate comprises:
   a) at least one magnet for use in isolating macromolecules from a mixture in a vessel when the macromolecules adhere to magnetic beads to form a complex;
   b) a top plate adapted to receive a plurality of magnets, wherein the top plate is in communication with at least one moveable connector and at least one support;
   c) at least one support having the top end and a bottom end that defines an axis, wherein during use the pipette tip applies force in a downward direction along the axis;
   d) at least one movable connector that communicates with the top plate and a base plate, wherein when in use and the movable connector is uncompressed, a compression gap is defined between the top plate and a base plate and when the movable connector is compressed, the compression gap is reduced or removed;
   e) a magnet support plate to support the magnet, wherein the magnet support plate is at the top plate;
   f) the base plate that is in communication with the support and is placed beneath the top plate, and
   g) a reversible compression lock that engages the top plate and the base plate, wherein when in a locked position, the top plate and magnet support plate are fixed and cannot move in the downward direction along the axis when the pipette tip applies force in the downward direction along the axis and when in an unlocked position, the top plate and magnet support plate are movable along the axis of the support; and wherein when in use the magnet and the vessel move together.

2. The magnet plate of claim 1, wherein the at least one movable connector comprises at least one spring that communicates with the top plate and a base plate, wherein when in use and the spring is uncompressed, a compression gap is defined between the top plate and a base plate and when the spring is compressed, the compression gap is reduced or removed.

3. The magnet plate of claim 2, wherein the magnet plate has a height and when in the locked position, the height is of the magnet plate is about the same as the height of the magnet plate when the spring is uncompressed.

4. The magnet plate of claim 2, wherein the magnet plate has a height and when in the locked position and the compression gap removed, the height is of the magnet plate is less than the height of the magnet plate when the spring is uncompressed.

5. The magnet plate of claim 2, further comprises two or more springs.

6. The magnet plate of claim 2, wherein at least one support comprises at least one post with a top end and a bottom end, the top plate has at least one post opening for receiving the top end of the post and at least one spring that surrounds the post, and a base plate that receives the bottom end of the post.

7. The magnet plate of claim 2, wherein at least one support comprises at least one post with a top end and a bottom end, the top plate receives the top end of the post and at least one spring that surrounds the post, and a base plate that at least one post opening for receiving the bottom end of the post.

8. The magnet plate of claim 1, wherein at least one movable connector comprises a spring, a foam pad, an air cushion, a magnet assembly, or a combination thereof.

9. The magnet plate of claim 1, wherein the reversible compression lock comprises at least one fastener housed in the base plate and when in the locked position, the fastener engages the top plate and when in the unlocked position, the fastener does not engage the top plate.

10. The magnet plate of claim 9, wherein the fastener of the reversible compression lock engages the top plate and maintains the compression gap.

11. The magnet plate of claim 9, wherein the fastener of reversible compression lock engages the top plate and removes the compression gap.

12. The magnet plate of claim 9, wherein the fastener comprises a screw, a latch, a nut & bolt arrangement, a clip, a magnet, an electromagnet, a locking pin, a spring, or a combination thereof.

13. The magnet plate of claim 1, wherein the reversible compression lock comprises at least one stopper and when in the locked position, the stopper engages the top plate and the bottom plate to maintain the compression gap, and when in the unlocked position, the stopper does not engage the top plate and the bottom plate to maintain the compression gap.

14. The magnet plate of claim 13, wherein the stopper comprises a block, a wedge, an insert, or an air bladder.

15. The magnet plate of claim 1, wherein the magnet plate can be locked or unlocked by the user as desired.

16. The magnet plate of claim 1, wherein the top plate comprises a plurality of magnet openings to receive the magnets.

17. The magnet plate of claim 1, further comprises two or more reversible compression locks.

18. A kit for use in isolating macromolecules from a mixture in a vessel with a pipette having a pipette tip, wherein the macromolecules adhere to magnetic beads to form a complex, wherein the kit comprises:
   a) a magnet plate that comprises:
      i) at least one magnet for use in isolating macromolecules from a mixture in a vessel when the macromolecules adhere to magnetic beads to form a complex;
      ii) a top plate adapted to receive a plurality of magnets, wherein the top plate is in communication with at least one moveable connector and at least one support;
      iii) at least one support having the top end and a bottom end that defines an axis wherein during use the pipette tip applies force in a downward direction along the axis;

iv) at least one moveable connector that communicates with the top plate and a base plate, wherein when in use and the movable connector is uncompressed, a compression gap is defined between the top plate and a base plate and when the movable connector is compressed, the compression gap is reduced or removed;

v) a magnet support plate to support the magnet, wherein the magnet support plate is at the top plate;

vi) the base plate that is in communication with the support and is placed beneath the top plate, and vii) a reversible compression lock that engages the top plate and the base plate, wherein when in a locked position, the top plate and the magnet support plate are fixed and cannot move in the downward direction along the axis when the pipette tip applies force in the downward direction along the axis and when in an unlocked position, the top plate and the magnet support plate are movable along the axis of the support; and wherein when in use the magnet and the vessel move together; and b) the vessel for holding the mixture having the macromolecule, wherein the vessel is placed within reach of a magnetic field of a magnet.

19. The kit of claim 18, wherein the kit further comprises magnetic beads.

20. The kit of claim 18, wherein at least one movable connector of the magnet plate comprises a spring, a foam pad, an air cushion, a magnet assembly, or a combination thereof.

21. The kit of claim 18, wherein the at least one movable connector comprises at least one spring that communicates with the top plate and the base plate, wherein when in use and the spring is uncompressed, a compression gap is defined between the top plate and the base plate and when the spring is compressed, the compression gap is reduced or removed.

22. The kit of claim 18, wherein the kit further comprises one or more buffer compositions.

23. The kit of claim 18, wherein the kit further comprises a tool to engage the reversible compression lock.

* * * * *